Figure 1:
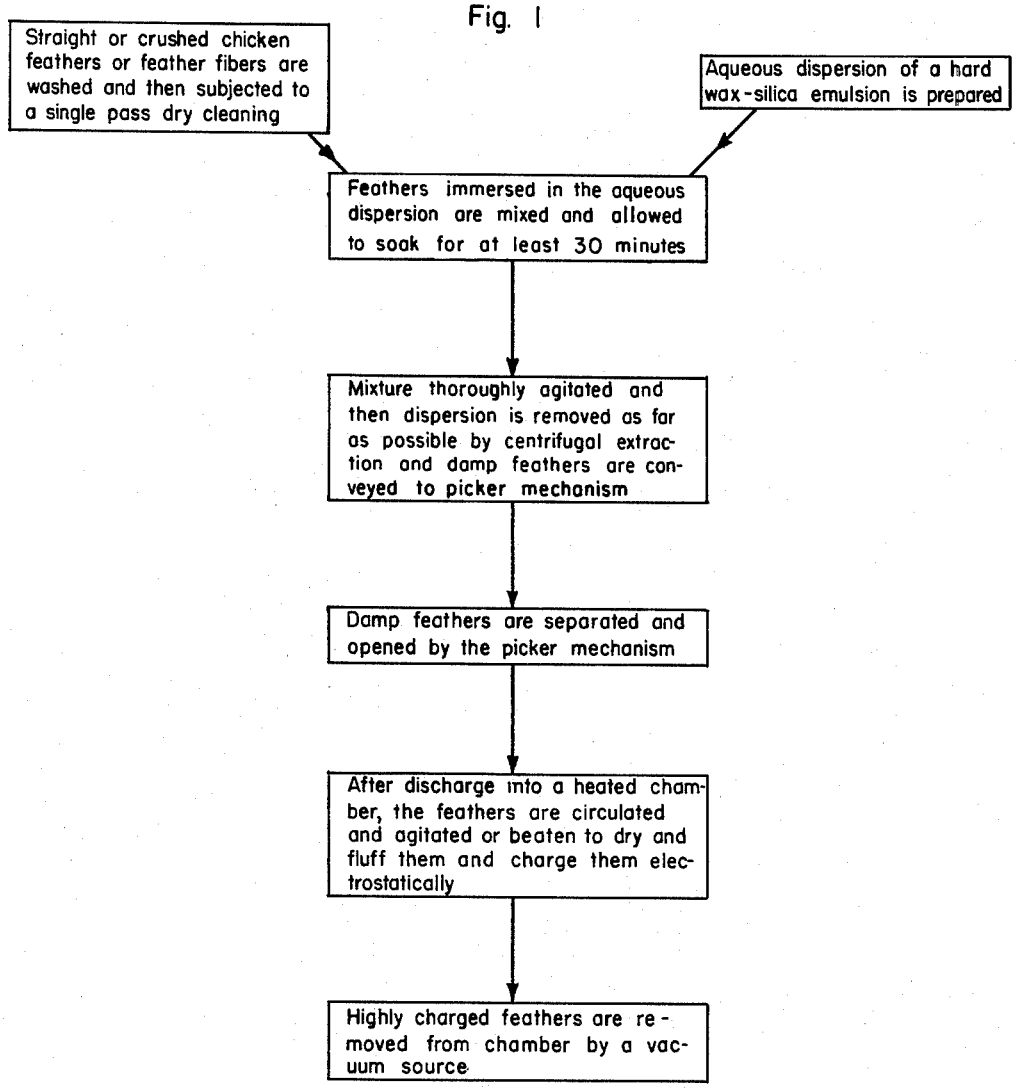

Aug. 2, 1955    E. R. FREDERICK    2,714,561
FEATHER TREATING METHOD
Filed Aug. 18, 1952    2 Sheets—Sheet 1

INVENTOR
Edward R. Frederick
BY
ATTORNEY

Aug. 2, 1955     E. R. FREDERICK     2,714,561
FEATHER TREATING METHOD

Filed Aug. 18, 1952     2 Sheets-Sheet 2

INVENTOR
*Edward R. Frederick*

BY

ATTORNEY though the chamber, its beater and the heating steam pipes were well grounded, the treated dry feathers were so highly charged that they clung to the sides and top walls and to the beater arms and could not be removed by hand, because as soon as a feather was touched by one hand it attached itself to that hand, and would attach itself to the other hand if removal from the first hand were attempted thereby. The feathers also clung with tenacity to wool clothing and metal furniture and any sent floating in the air during the removal process (to be described) would drift toward a metal object and cling there. The static charge was far more pronounced than the charge on damp waterfowl feathers and down. To

United States Patent Office 2,714,561
Patented Aug. 2, 1955

2,714,561

FEATHER TREATING METHOD

Edward R. Frederick, Pittsburgh, Pa., assignor to the United States of America as represented by the Secretary of the Army Application August 18, 1952, Serial No. 304,874

6 Claims. (Cl. 117—55)

This invention relates to methods of treating feathers, especially chicken and other land fowl feathers.

The conventional waterfowl down and feather mixture used as a filler for sleeping bags is generally satisfactory, but is much too expensive and is not available in this country in sufficient quantity to satisfy both military and civilian demands. Therefore research has turned to chicken feathers (which chemically are similar to duck and goose feathers) as probably the least expensive and most readily available raw product capable of being processed to become a satisfactory filler. Some of the results of this research are disclosed in my pending application Ser. No. 276,985 filed March 17, 1952, wherein several ways of increasing the filling power of straight and crushed chicken feathers are described. The present application includes some of the matter disclosed but not claimed in said pending application.

In explanation of the term "filling power," reference may be made to the report entitled "A Proposed Method for Measuring the Filling Power of Down and Feathers," by Henry A. Sinski, publication No. TD 103037, The Office of Technical Services, U. S. Department of Commerce, and to the article by N. B. Edelman in Textile Research Journal, vol. 17, p. 199 (1947), entitled "Investigation of methods for determining the filling power of feathers."

Waterfowl downs have a unique form comprising very stiff fibers radiating from a central low density core, these fibers being apparently four to ten times stiffer than chicken feather barbs, which partly accounts for the high filling power of such downs. Chicken feathers are straight vaned with their barbs and barbules invariably oriented in one plane. Waterfowl downs owe part of their filling power to a marked electrostatic charge, seemingly due to the extremely effective natural water repellent finish protecting the fibers. Straight chicken feathers (i. e., straight run or fractionated feathers which have been merely washed and dried) have a natural finish of some water repellency, but this natural finish reduces filling power as much as 40% and inhibits the addition of waxes, resins or elastomers. Straight chicken feathers develop an electrostatic charge apparently of the di-pole type, while commercial crushed chicken feathers possess little or no tendency to develop an electrostatic charge. Waterfowl feathers have greater filling power under high humidity conditions than when dry, due to a higher curl which seems to arise because of moisture plasticization and internal stresses, but chicken feathers show no tendency to curl in the presence of moisture.

Figure 2:
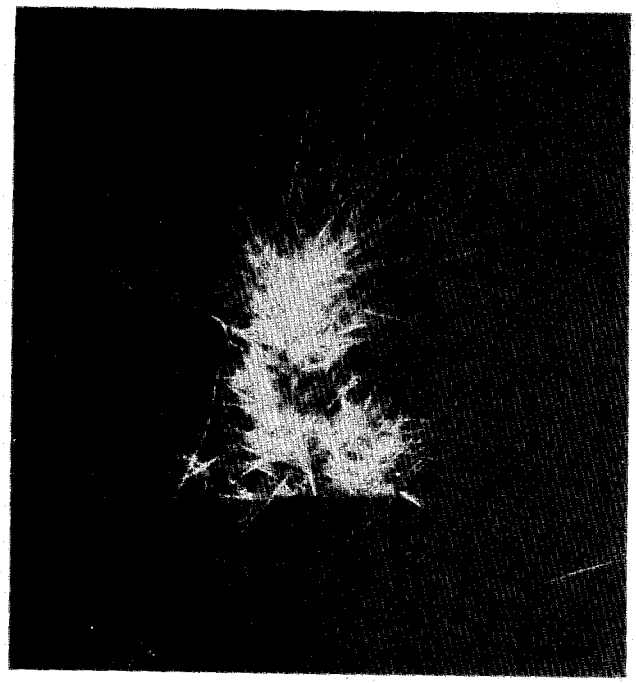

The principal object of this invention is to provide a simple process for treating chicken and other land fowl feathers, including straight feathers and commercial crushed feathers (so-called "curled" feathers) so as greatly to increase their filling power and other properties and thereby make them acceptable as a relatively inexpensive substitute for the standard waterfowl down and feather mixture. Other objects will be apparent from the following description of the preferred procedure of the invention. In the accompanying drawings, Fig. 1 is a diagram or flow sheet of the process; and Fig. 2 is a reproduction of an enlarged photograph of a treated chicken feather prepared pursuant to the invention.

The process starts with partial extraction by solvents of the natural oil and/or wax found on chicken feathers or fibers or crushed chicken feathers. Washing may be employed, followed by a single pass dry cleaning, in which solvents such as alcohol, benzene, carbon tetrachloride, or perchlorethylene may be used. 100 gm. of a 14% hard wax emulsion and 5 gm. of hydrophobic silica gel were stirred together in a beaker, and the mixture was then poured into a Waring Blendor, and treated for about one minute to form an emulsion or suspension. (The hydrophobic silica gel was prepared from ordinary silica gel by treating with dichlorodimethylsilane.) Then this emulsion or suspension was diluted with water at about room temperatures to form a dilute emulsion or dispersion of 3000 gm. To 150 gm. of the dry cleaned chicken feathers, straight or crushed, and enclosed in a vessel, the entire dilute emulsion was added by pouring, and the mixture was allowed to stand with occasional slow stirring not less than thirty minutes or up to four hours to get the proper penetration. Next the mixture was put in a washing and wringing machine, which thoroughly mixed the feathers and the emulsion and then partially removed the emulsion by centrifugal force. The result of the process was a mass of damp crushed feathers weighing 300 gm. of which 150 gm. was dispersion containing 0.095 gm. of solid additive or 0.633% by weight. Of this 0.46% was the wax and 0.166% the hydrophobic silica gel.

The coated damp feathers were then fed to a picker, and were blown off the picker into a fluffing and conditioning machine, as shown in the Frederick, Jaskowski and Haller application Ser. No. 362,460 filed June 18, 1953. Here the feathers were circulated in a closed but vented chamber by heated air currents with constant agitation from mechanically driven beater arms revolving inside the chamber. (A light is preferably inside the chamber so as to permit observation of the process from outside by looking through a window in the side wall of the chamber, and preferably the chamber also has a Westinghouse ozonizing lamp to inhibit bacterial growth and destroy odors.) This part of the process continued for about twenty minutes, when the feathers were completely dry, were highly charged with static electricity, and had a pleasant odor.

remove the treated feathers from the chamber it may be desirable to use a vacuum tank and collecting nozzle, or the treated feathers may be discharged directly into a porous container to be retained therein until used in further processes, for example, the processes of my pending application Ser. No. 276,985.

Feathers treated by the inventive process were not only highly charged, they were materially stiffer, so that their filling power was much greater, and they had an anti-lubricating finish, which is important to obviate any tendency of adjacent feathers to slide or slip over each other. The wax coating was not powdery but was present as a clear tenacious film which conferred remarkable properties upon the feathers. It has been discovered that wax solutions generally leave a powdery wax coating on crushed chicken feathers, which of course is highly unsatisfactory. Aqueous dispersions or emulsions seem to be essential when working with dry cleaned, crushed chicken feathers.

Table I gives some of the properties of different runs of treated crushed chicken feathers.

TABLE I

Showing effect of treatment on electrostatic charge and filling power of crushed chicken feathers twice dry cleaned and treated as indicated

| Identification of Run | Treatment | Relative Electrostatic Charge | Filling Power (cm.) |
|---|---|---|---|
| M-55 | None | P | 2.8 |
| M-51 | 7% Wax A | F | 3.8 |
| M-58 | Wax BVC | P | 4.3 |
| M-57 | Wax ACR | G | 4.7 |
| M-66 | Wax G | N | 5.3 |
| M-67 | Wax FL+Silica Gel | N | 4.6 |
| M-62 | Wax ACR+Wax G+Silica Gel | E | 6.0 |
| M-59 | Wax ACR+Silica Gel | E | *6.0 |
| M-69 | Wax G+Silica Gel | E | **6.0 |

*Substantially greater than 6.0.
**Very much greater than 6.0, i. e., between 8 and 12.

Notes

Electrostatic Charge observed as N=none, P=poor, F=fair, G=good, E=very high.
(2) Wax A was S. C. Johnson's traffic wax, solvent type. Wax BVC was "Amber B," 10 parts, plus 4 parts "Ceramid" (both of Glyco Products Co.) plus petrolatum, well mixed. Wax ACR was "Aerowax" of Glyco Products Co. Wax G was S. C. Johnson's traffic wax in emulsion form. Wax FL was "Flexowax" of Glyco Products Co. All these are hard waxes.
(3) The sample for Run M-69 was conditioned for 24 hours at 70° F., 65% relative humidity prior to evaluation.

TABLE II

Showing for comparison, electrostatic and filling power tests on 40-60 mixtures of duck down and feathers

| Identification of Run | Treatment | Relative Electrostatic Charge | Filling Power |
|---|---|---|---|
| M-70 | None | G | 6.2 |
| K-61C | do | G | 5.7 |
| M-81 | do | F | 5.3 |
| M-79 | Treated with Wax G+Silica Gel as per description. | E | 7.6 |

Table I makes it clear that while the best results by far were obtained when hydrophobic silica gel was added to the hard wax dispersion or emulsion, still certain waxes, e. g. Wax BVC, Wax ACR and Wax G used alone greatly increased the filling power of the crushed chicken feathers. Wax G alone was better than Wax FL plus hydrophobic silica gel, for some unknown reason. Also by comparing the results of Table II with the last three runs of Table I, it is evident that cleaned crushed chicken feathers, treated with certain hard waxes and hydrophobic silica gel, will attain a filling power very much higher than some 40-60 mixtures of domestic duck down and feathers, whether treated or not treated.

Filling power was determined for both tables by using the Sinski apparatus which is disclosed in the pending application of Henry A. Sinski et al., Ser. No. 266,583, filed January 15, 1952, allowed March 11, 1955. In runs M-81 and M-79, a water film was formed on the cylinder walls to eliminate any static on said walls. Static will cause the feathers to adhere tenaciously to the walls, thus binding the piston, which will give misleading filling power readings. Note that filling power values rise with the increase in electrostatic charge. A conclusion drawn from many evaluations is that the electrostatic charge is frequently responsible for as much as 25% of the filling power value; in other words, remove the charge and the filling power will drop as much as 25%. High electrostatic charges cause the barbs of a feather particle to repel each other and fan out in all directions, so that treated crushed chicken feather particles have a fairly close resemblance in appearance to waterfowl down particles: both have radiating barbs or barbules, the chicken feather barbs being, however, longer, straighter and stiffer, at least when freshly charged. Fig. 2 of the accompanying drawings gives a fair idea of the appearance of a chicken feather treated in accordance with the invention, the magnification being 3:1.

In addition to the hard wax emulsion mentioned above and the hydrophobic silica gel, I may employ fungicides, bactericides, pesticides, and other active agents which are desirable to preserve the feathers against degradation by molds, insects, bacteria, etc. These agents may be mixed with the wax dispersion or emulsion prior to the mixing of the feathers.

In the subjoined claims, for convenience, I use the term "feathers" to denote straight or whole feathers, fractionated feathers, feather fibers, commercial crushed feathers, mechanically curled feathers, and stripped feathers, and equivalent land fowl products.

I am aware that in the Wolffenstein Patent No. 800,197, dated September 26, 1905, it was proposed to make ostrich feathers permanently curly by coating the feathers with a one per cent solution of wax in methyl alcohol. I do not claim any such process, but I claim:

1. A method of treating land fowl feathers which comprises removing most but not all of the natural oil and wax from the feathers, immersing them in an aqueous dispersion of a hard wax, allowing the mixture to stand for at least thirty minutes, removing most of the dispersion so that the feathers are merely damp, opening the barbs of the feathers while still damp, drying the opened feathers by circulating them in a closed heated chamber with concomitant agitation to fluff them and build up a strong electrostatic charge, and removing the fluffed feathers from the chamber.

2. The method of claim 1 wherein the aqueous wax dispersion is of such strength and composition as to add about 0.6% by weight of dry material to the feathers and forms a clear tenacious film on the feathers which substantially increases their filling power.

3. The method of claim 1 wherein the aqueous dispersion is formed in the proportions of approximately 100 gm. of a 14% hard wax emulsion and about 5 gm. of hydrophobic silica gel blended and diluted with water to weigh about 3000 gm.; the aqueous dispersion about equaling the weight of the feathers immersed in it.

4. The product of the process of claim 1.

5. A method of treating land fowl crushed feathers which comprises removing a major fraction of the natural oil and wax from the feathers, immersing them in an aqueous dispersion of a hard wax for not less than half an hour nor more than four hours, removing most of the aqueous dispersion by centrifugal separation, picking the damp crushed feathers to separate them and open their barbs, blowing the opened feathers into a closed chamber, agitating the feathers by hot air currents and mechanical beating in said chamber and continuing the heating and agitation until the feathers are dry, fluffy and highly charged electrostatically, and removing the feathers from the chamber by vacuum suction.

6. The method of claim 5 wherein the aqueous dispersion is formed in the proportions of approximately 100 gm. of a 14% hard wax emulsion and 5 gm. of hydrophobic silica gel blended and then diluted with water to weigh approximately 3000 gm.; the weight of the aqueous dispersion picked up by the feathers being substantially equal to the weight of the dry feathers.

References Cited in the file of this patent

UNITED STATES PATENTS

| | | |
|---|---|---|
| 118,668 | Adamson | Sept. 5, 1871 |
| 505,141 | Tausk | Sept. 19, 1893 |
| 771,999 | Potter | Oct. 11, 1904 |
| 800,197 | Wolffenstein | Sept. 26, 1905 |
| 2,624,685 | Horvath | Jan. 6, 1953 |